United States Patent [19]

Tüns et al.

[11] Patent Number: 5,306,096
[45] Date of Patent: Apr. 26, 1994

[54] ADJUSTABLE COUPLING BETWEEN A ROTARY COMPONENT AND A CYLINDRICAL SHAFT

[75] Inventors: Heinz J. Tüns, Dachsen; Hermann Murbach, Schaffhausen, both of Switzerland

[73] Assignee: Sig Schweizerische Industrie-Gesellschaft, Neuhausen am Rheinfall, Switzerland

[21] Appl. No.: 935,428

[22] Filed: Aug. 26, 1992

[30] Foreign Application Priority Data

Aug. 27, 1991 [CH] Switzerland .......... 2509/91-7

[51] Int. Cl.$^5$ .............................. F16D 1/08
[52] U.S. Cl. ...................... 403/344; 403/312; 403/370; 403/290
[58] Field of Search ........ 403/344, 312, 313, 309–310, 403/365–371, 373, 289, 290; 464/97–99

[56] References Cited

U.S. PATENT DOCUMENTS

| | | | |
|---|---|---|---|
| 1,700,006 | 1/1929 | Wallace et al. | 403/344 |
| 2,487,128 | 11/1949 | Hahn | 403/370 |
| 3,139,296 | 6/1964 | Greene | 403/373 |
| 3,236,572 | 2/1966 | White, Sr. | 403/344 X |
| 3,281,170 | 10/1966 | Kaplan | 403/373 |
| 3,445,130 | 5/1969 | Obenshain | 403/373 X |
| 3,473,202 | 10/1969 | Howard | 403/290 X |
| 3,738,691 | 6/1973 | Firty | 403/370 |
| 3,917,424 | 11/1975 | Zugel | 403/344 X |
| 4,217,061 | 8/1980 | Eiland et al. | 403/344 X |
| 4,637,750 | 1/1987 | Ward | 403/344 |
| 4,966,076 | 10/1990 | John | 101/216 |
| 5,067,845 | 11/1991 | Schlueter | 403/290 X |

FOREIGN PATENT DOCUMENTS

| | | |
|---|---|---|
| 360739 | 3/1990 | European Pat. Off. |
| 3930304 | 3/1991 | Fed. Rep. of Germany |
| 1026964 | 4/1966 | United Kingdom |

*Primary Examiner*—Randolph A. Reese
*Assistant Examiner*—Harry C. Kim
*Attorney, Agent, or Firm*—Spencer, Frank & Schneider

[57] ABSTRACT

A rotary assembly for attachment to a rotary shaft includes a rotary body; and a bore hole extending in the rotary body from one end thereof for coaxially receiving a rotary shaft. The bore hole has a longitudinal axis coinciding with a rotary axis of the shaft when received in the bore hole. A parting split defining a clearance extends in the rotary body from one end thereof. The parting split extends in a plane which contains the longitudinal axis. A slot extends in the rotary body from the parting split on either side of the bore hole. The slot defines a dividing plane which traverses the longitudinal axis and which divides the rotary body into first and second axially adjoining body parts. The bore hole extends consecutively in the first and second body parts, and the bore hole which extends in the first body part is circumferentially closed. Two clamping wings are defined in the second body part by the parting split, the slot and the bore hole extending in the second body part. Two clamping bolts pass through the second body part and traverse the parting split for tightening the clamping wings to a rotary shaft passing through the bore hole.

12 Claims, 2 Drawing Sheets

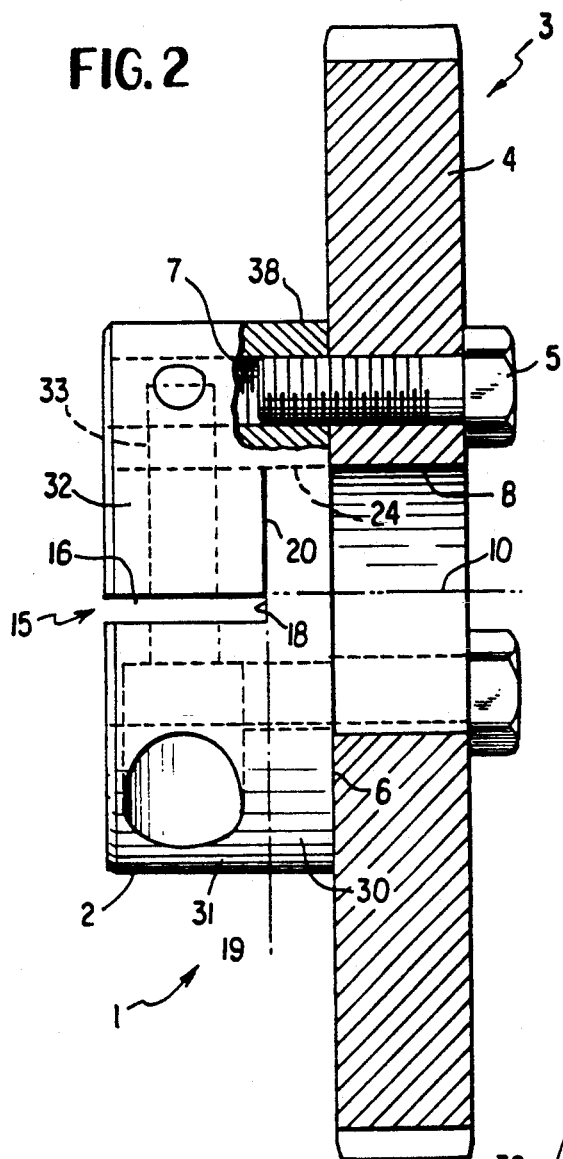
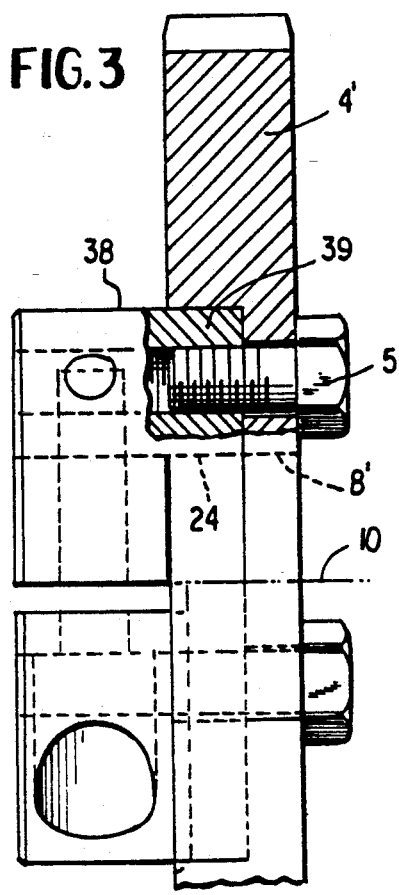
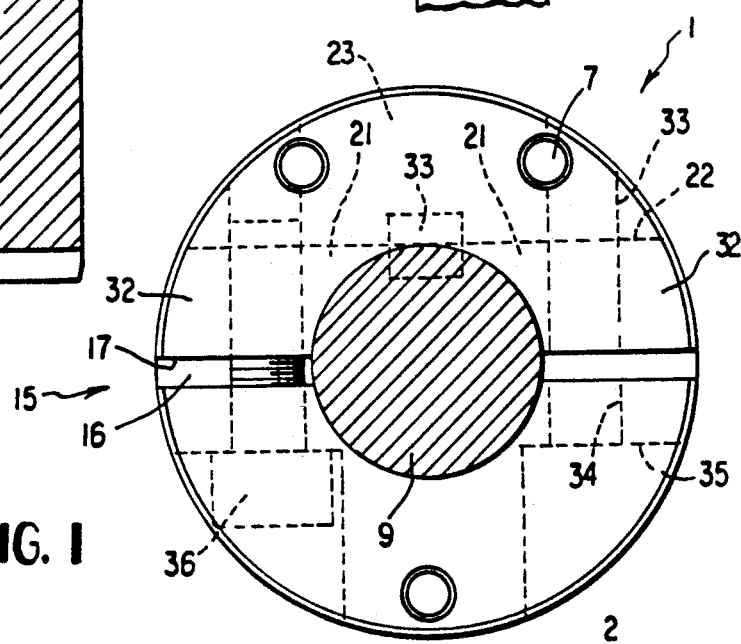
FIG. 2
FIG. 3
FIG. 1

ADJUSTABLE COUPLING BETWEEN A ROTARY COMPONENT AND A CYLINDRICAL SHAFT

CROSS REFERENCE TO RELATED APPLICATION

This application claims the priority of Swiss Application No. 2509/91-7 filed Aug. 27, 1991, which is incorporated herein by reference.

BACKGROUND OF THE INVENTION

This invention relates to an adjustable coupling between a rotary component and a cylindrical shaft wherein the rotary component has a parting split along a plane containing the axis of the shaft. Further, two clamping screws tighten the rotary component to the shaft in a direction transverse to the parting split.

To provide an adjustable coupling between a shaft and a rotary body it is known to divide the rotary component into two halves along a parting split which contains the shaft axis and to use two tightening screws on either side of the shaft for clamping the two halves together in a clamping direction which is perpendicular to the shaft axis. For obtaining a positive, frictional connection, the two component halves have to be at a slight distance from one another in a direction perpendicular to the parting split. Such distance varies, dependent from a deviation of the shaft diameter from a nominal value. In case the rotary component is a cam disc, the course of the cam track changes dependent on the shaft diameter and, dependent upon the inclination of the cam track to the radial direction, sudden changes (jumps) in the course of the cam track in the parting split may also be present. Thus, precision cam track discs have to be paired off with designated shafts; it is thus not possible to replace such discs with pre-made, other discs that are not associated with the same shaft.

SUMMARY OF THE INVENTION

It is a object of the invention to provide an improved coupling device of the above-outlined type for a rotary assembly from which the discussed disadvantage is eliminated.

This object and others to become apparent as the specification progresses, are accomplished by the invention, according to which, briefly stated, the rotary assembly for attachment to a rotary shaft includes a rotary body; and a bore hole extending in the rotary body from one end thereof for coaxially receiving a rotary shaft. The bore hole has a longitudinal axis coinciding with a rotary axis of the shaft when received in the bore hole. A parting split defining a clearance extends in the rotary body from one end thereof. The parting split extends in a plane which contains the longitudinal axis. A slot extends in the rotary body from the parting split on either side of the bore hole. The slot defines a dividing plane which traverses the longitudinal axis and which divides the rotary body into first and second axially adjoining body parts. The bore hole extends consecutively in the first and second body parts, and the bore hole which extends in the first body part is circumferentially closed. Two clamping wings are defined in the second body part by the parting split, the slot and the bore hole extending in the second body part. Two clamping bolts pass through the second body part and traverse the parting split for tightening the clamping wings to a rotary shaft passing through the bore hole.

BRIEF DESCRIPTION OF THE DRAWINGS

FIG. 1 is a front elevational view of a preferred embodiment of the invention.

FIG. 2 is a partially sectional side elevational view of the preferred embodiment.

FIG. 3 is a partially sectional side elevational view of another preferred embodiment of the invention.

DESCRIPTION OF THE PREFERRED EMBODIMENTS

Figure 4:
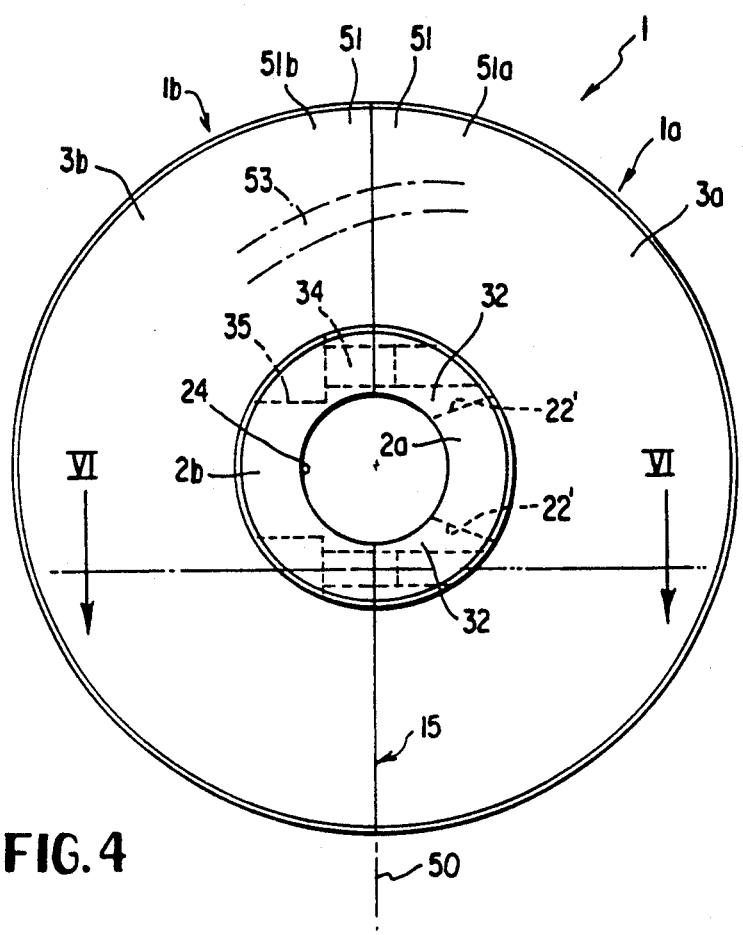
FIG. 4 is an end elevational view of still another embodiment of the invention.

Turning to the embodiment illustrated in FIGS. 1 and 2, there is shown therein a rotary component 1 formed of a cylindrical hub 2 and a force-transmitting element 3 constituted by a gear wheel 4 which is tightened to a radial end face 6 of the hub 2 by means of three axially parallel oriented screws 5 received in threaded bores 7 of the hub 2. The gear wheel 4 is, by means of its central opening 8, centered on a shaft 9. Further, the angular position of the gear wheel 4 relative to the hub 2 may be fixed by means of a form-fitting positioning element, such as an axially parallel extending pin (not shown).

The hub 2 is a one-piece hollow cylinder provided, along one part of its axial length, with a parting split 15 formed of an axially parallel slot 16 bounded by two side walls defining a clearance. The lateral surface 17, which is one of two side walls bounding the slot 16, has a plane that contains the shaft axis 10, whereas the base 18 of the slot 16 is oriented perpendicularly to the shaft axis 10. Starting from the base 18 and the side wall 17 (whose plane contains the shaft axis 10) there extends a second, significantly narrower slot 20 which may be provided, for example, with an electro-erosion process by means of a thin, tight wire. The slot 20 extends only along one part of the radius of the hub 2 and lies in a dividing plane 19 which is oriented perpendicularly to the shaft axis 10. Viewed in the axial direction (FIG. 1), the sum of the surfaces 21 of the slot 20 is approximately identical to the cross-sectional surface 23 of the hub 2 remaining externally of the base 22 of the slot 20. Stated differently, the area of the dividing plane 19 within the slot 20 is at least one fourth of the total cross-sectional area of the hub 2 in the dividing plane 19. The hub 2 is provided with a cylindrical throughgoing bore 24 which is in alignment with the bore 8 and which forms a sliding seat with the shaft 9.

The dividing plane 19 of the slot 20 divides the hub 2 axially into a first part 30 and a second part 31. The radial sections in the part 30 are uninterrupted around the circumference, and the gear wheel 4 is flanged to the part 30. In the part 31 the slots 16 and 20 form two clamping wings 32 which can elastically pivot relative to the part 30 and the shaft 9. In each clamping wing 32 there is provided a threated bore 33 which is oriented perpendicularly to the side wall 17 and thus to the shaft axis 10. In the hub part 31, on the other side of the slot 16, there are provided throughgoing bores 34 having cylindrical countersunk portions 35. The clamping wings 32 ar tightened against the shaft 9 by two screws 36 to thus frictionally clamp the hub 2 to the shaft 9. The screws 36 have hollow, inner hexagonal heads. The hub portion 30 is practically deformation-free and is, by means of the throughgoing hub bore 24, accurately centered on the shaft 9. By virtue of this arrangement there is achieved a precise circular run of the force-transmitting element 3 without any axial wobble and there is, at the same time, provided an adjustability of the element 3 relative to the shaft 9 in the circumferential and axial directions.

In case an adjustability is required only in the axial direction, the shaft 9 and the hub 2 may additionally have a wedge groove receiving a locking key 37 shown in phantom lines in FIG. 1.

Turning to FIG. 3, since the hub portion 30 is closed along its circumference and therefore its cylindrical outer face 38 does practically not deform during the tightening of the screws 36, the gear wheel 4' may also be centered on the surface 38 by means of a cylindrical countersunk recess 39 provided in the gear wheel 4' and the bore 8' of the gear wheel 4' may have accordingly a greater diameter. This variant has the advantage that the hub 2 projects axially to a lesser extent and/or the hub portion 30 is guided on the shaft 9 along a greater axial path and thus the end face 6 of the hub 2 is oriented with a greater accuracy perpendicularly to the shaft axis 10.

As a departure from the embodiment illustrated in FIGS. 1 and 2, the hub 2 and the force-transmitting element 3 may constitute a one-piece component. The element 3 may also be, for example, a cam disc, a sprocket wheel, a bevel gear, a crank or the like.

Figure 5:
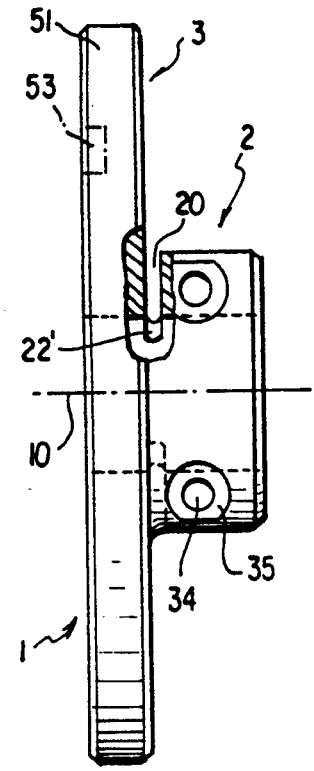
FIG. 5 is a side elevational view of the structure shown in FIG. 4.
Figure 6:
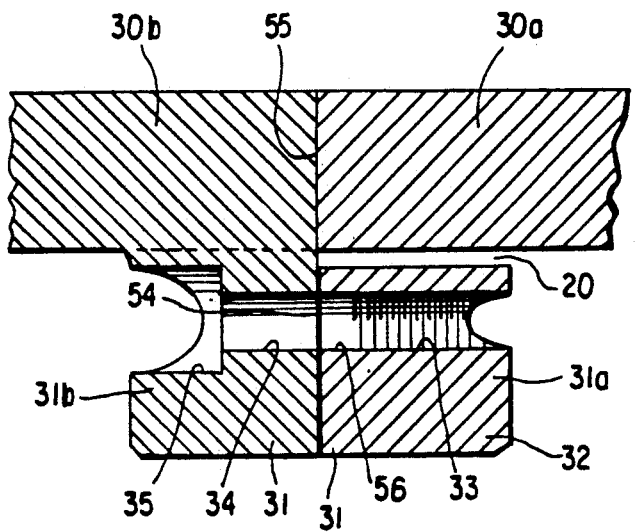
FIG. 6 is a sectional view taken along line VI—VI of FIG. 4.

Turning now to the embodiment illustrated in FIGS. 4, 5 and 6, this construction differs from the embodiment shown in FIGS. 1 and 2 in that the force-transmitting element 3 and the hub 2 are each divided into two halves 2a, 2b and, respectively, 3a, 3b along a plane 50 which contains the shaft axis 10 and which forms the parting split 15. Further, the hub halves 2a and 2b are formed as one-piece integral components with respective component halves 3a, 3b. This embodiment has the advantage that it may be retroactively inserted on an installed shaft 9, tightened thereto or removed therefrom in a radial direction.

The two component halves 3a and 3b together form a cam disc 51, whose radial end face 52 oriented away from the hub 2, contains a milled guide track 53 having a rectangular cross section as indicated in dash-dot lines in FIGS. 4 and 5. The two disc halves 51a and 51b lie along the plane 50 in a close fit and thus form the rotary component portion 30 closed along its circumference. The component portion is axially separated from the second rotary component portion 31 by two transverse slots 20 extending in the same plane. The slots 20 are, starting from the parting split 15 milled in such a manner that their bottom 22' is oriented approximately 60° to the parting split 50. The bottom 22' is preferably rounded in order to prevent nicks therein. The slots 20 form two clamping wings 32 with the parting split 15 on the hub half 2a. The sum of the two slot surfaces is preferably greater than 60% of the entire cross-sectional surface of the hub half 2a in the slit plane. The face 54 of the hub half 2a oriented towards the parting split 15 is slightly set back relative to the corresponding surface 55 of the disc half 51, so that between the two hub halves 2a and 2b a narrow gap is formed for allowing the clamping wings 32 to be tightened against the shaft 9. The threaded bores 33 have, starting from the parting split 15, a cylindrical countersunk portion 56.

The described coupling devices according to the invention have very few individual components and may therefore be manufactured in an economical manner. They permit an accurate positioning of the rotary component on the shaft without the need for pairing off the two parts. In this manner, a simple replacement of parts is possible. Tests have shown that two-part cam discs as described in the embodiment according to FIGS. 4, 5 and 6 have the same service life as single-piece cam discs. Multi-part cam discs of the embodiment according to FIGS. 4, 5 and 6 make possible a simple assembly on an already installed shaft. By virtue of the invention a circumferential frictional effect is achieved in both rotary directions holding the rotary body securely in its position relative to the shaft even at high torques.

It will be understood that the above description of the present invention is susceptible to various modifications, changes and adaptations, and the same are intended to be comprehended within the meaning and range of equivalents of the appended claims.

What is claimed is:

1. A rotary assembly for attachment to a rotary shaft, comprising
   (a) a rotary body having an end;
   (b) a bore hole extending in said rotary body from said end for coaxially receiving a rotary shaft; said bore hole having a longitudinal axis coinciding with a rotary axis of the shaft when received in the bore hole;
   (c) a parting split defining a clearance and extending in said rotary body from said end; said parting split extending in a plane containing said longitudinal axis;
   (d) a slot extending in said rotary body from said parting split as a continuation thereof on opposite sides of said bore hole; said slot defining a dividing plane traversing said longitudinal axis and dividing said rotary body into first and second axially adjoining body parts; said bore hole extending consecutively in said first and second body parts; said bore hole extending in said first body part being circumferential closed;
   (e) two clamping wings defined in said second body part by said parting split, said slot and said bore hole extending in said second body part; and
   (f) two clamping bolts passing through said second body part and traversing said parting split for tightening the champing wings to a rotary shaft passing through said bore hole.

2. The rotary assembly as defined in claim 1, wherein said dividing plane is oriented perpendicularly to said longitudinal axis.

3. The rotary assembly as defined in claim 1, further comprising threaded bores provided in said clamping wings; said clamping bolts being situated adjacent said end and being received in said threaded bores.

4. The rotary assembly as defined in claim 1, wherein the area of said dividing plane within said slot is at least one fourth of a total cross-sectional area of said rotary body in said dividing plane.

5. The rotary assembly as defined in claim 1, wherein said rotary body is a two-part hub divided along said parting split; further comprising a two-part force-transmitting element forming a single-piece component with a respective said rotary body half.

6. The rotary assembly as defined in claim 1, wherein said rotary body is a two-part component divided along said parting split into two rotary body halves.

7. The rotary assembly as defined in claim 6, wherein said slot is provided solely in one of the two rotary body halves.

8. The rotary assembly as defined in claim 1, wherein said rotary body constitutes a single-piece hub; said parting split being provided solely in said second body part.

9. The rotary assembly as defined in claim 8, wherein said parting split has a base constituting an end of said parting split within said hub; said slot extending radially from said base.

10. The rotary assembly as defined in claim B, further comprising a force-transmitting element and securing screws tightening said force-transmitting element to said hub; said securing screws being parallel to said longitudinal axis.

11. The rotary assembly as defined in claim 10, wherein said force-transmitting element is selected from the group consisting of a cam disc, a gear wheel, a chain sprocket and a crank.

12. The rotary assembly as defined in claim 10, wherein said hub has an outer cylindrical surface and said force-transmitting element is centered on said outer cylindrical surface.

* * * * *